March 20, 1956 F. ESSIG 2,738,983
HAND TRUCKS PROVIDED WITH DETACHABLE DOLLIES
Filed Oct. 8, 1953 3 Sheets-Sheet 3

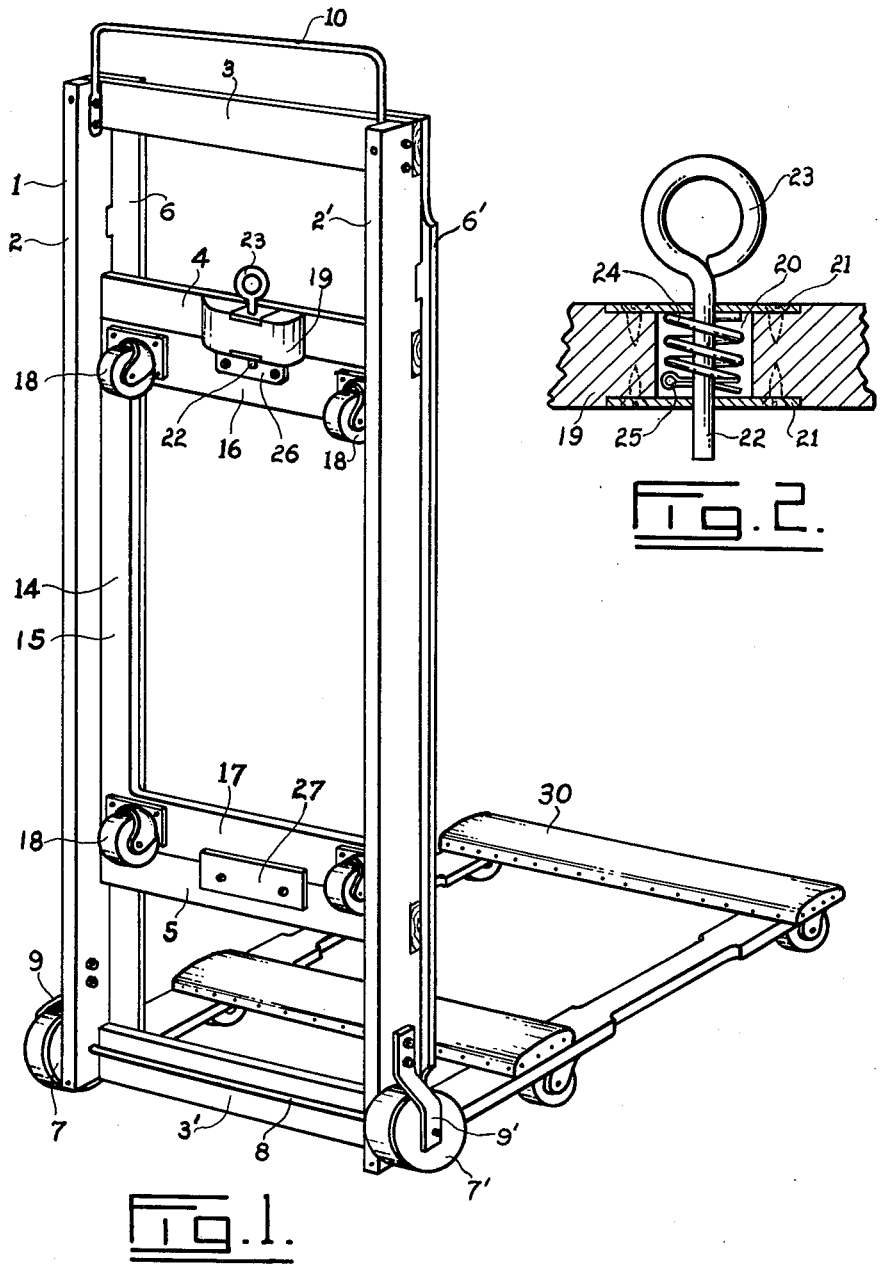

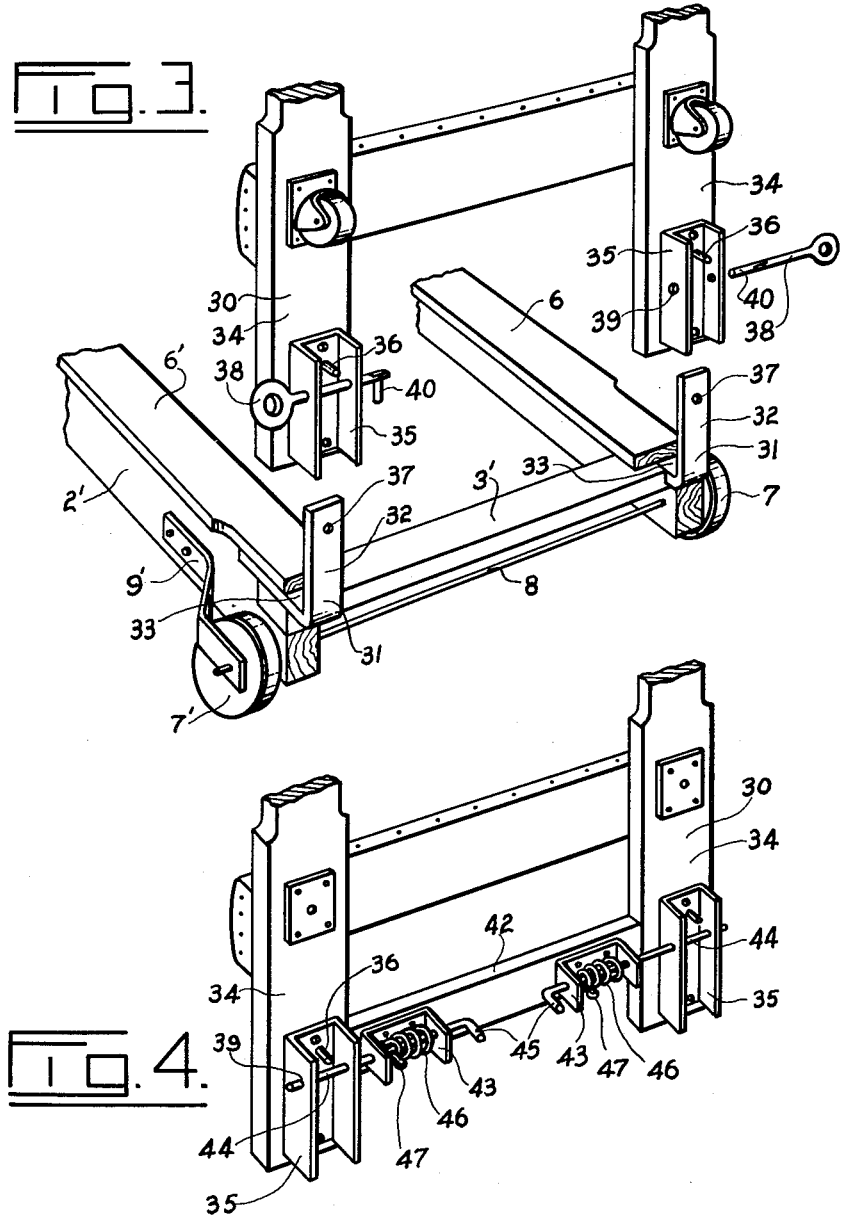

INVENTOR.
BY Fred Essig

United States Patent Office 2,738,983
Patented Mar. 20, 1956

2,738,983
HAND TRUCKS PROVIDED WITH DETACHABLE DOLLIES
Fred Essig, Chicago, Ill.
Application October 8, 1953, Serial No. 384,885
2 Claims. (Cl. 280—34)

This invention relates to a hand truck assembly useful for moving heavy equipment such as pianos, stoves, refrigerators, hot water heaters, oil drums and the like.

An object of this invention is to produce a portable hand truck in which the main frame of said truck is constructed to permit the insertion of a removable dolly therein. When said dolly is thus inserted, the main frame of the truck may be tilted to a horizontal position and then used as a push truck to move a load of equipment in a desired place as, for instance, in a moving van. By tilting the truck forward, the dolly may be easily removed and the load set down on the frame which then serves as a stationary skid which will not slide or roll about.

Another object of this invention is to produce a portable hand truck in which the forward end of said truck is adapted to receiving a removable dolly attachment at substantially a right angle thereto. An advantage of such a detachable section at the forward end of the frame of said hand truck is realized when two or more operators are at the opposite ends of the horizontally placed truck frame attempting to put a heavy object thereupon. The encumbrance of the ordinary stationary end member is eliminated while loading, and yet when it becomes necessary to up-end the object for moving through small or narrow corridors, the required dolly may be readily attached to the main frame.

A further object of this invention is to provide rapidly manipulated means for locking the aforesaid dollies to the main frame of the hand truck.

A further object of my invention is to provide a compact multiple purpose piece of equipment which will consume a minimum amount of space in a moving van and still make available to the operator extra dollies which may be used independently of the hand truck. Such dollies are especially useful for moving miscellaneous household equipment.

In accomplishing these and other objects of my invention, hereinafter pointed out, I have provided improved structures which are illustrated in the accompanying drawings wherein:

Figure 1 is a perspective view of the device including the frame of the hand truck with a removable dolly inserted within the frame, and another dolly locked in position at the forward end of said frame.

Figure 2 is an enlarged detail view of a spring release means used for holding a dolly within the main frame.

Figure 3 is a fragmentary perspective view of a means for connecting a dolly to the forward end of said hand truck.

Figure 4 is a fragmentary perspective view of an alternative means of connecting a dolly to the forward end of said hand truck.

Figure 5:
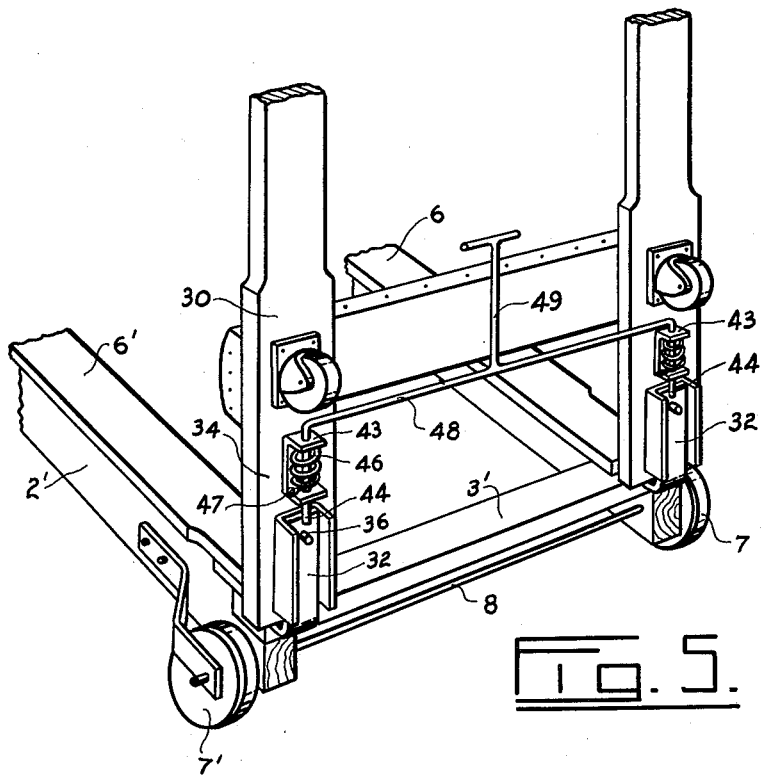
Figure 5 is another fragmentary perspective view of still another alternative means of connecting a dolly to the forward end of the hand truck.

Referring to the drawings in Figure 1, there is shown a hand truck in which the numeral 1 designates a rectangular frame structure formed by the parallel side members 2, 2', and end members 3, 3'. The side members 2, 2' are braced by the transversely extending cross members 4 and 5. Extending the full length of the side members and mounted on the upper surfaces thereof are a pair of platform members. These platforms are substantially flush with the outer sides of the side members and project inwardly toward the center of the rectangular hand truck frame.

At the forward end of said truck is a set of wheels 7, 7' rotatably mounted on an axle 8 and held against the sides of the frame by a pair of brackets 9, 9'. When the operator desires to tilt the frame to more conveniently move a load, he applies a downward pulling or lifting force on a handle 10 located at the rearward end of the frame, the fulcrum of the frame being located at the forward wheels 7, 7'.

Means is provided on the frame for releasably retaining a dolly 14 on the lower surface thereof, said dolly including a rectangular frame having side members 15, end members 16 and 17, and casters 18. The side and end members normally bear against the inner surfaces of the sides 2, 2' and cross members 4 and 5 of the hand truck frame respectively, while the upper surfaces of said side members 15 contact the lower surface of the platform members 6, 6'.

The dolly 14 is held secure by a retaining means. This retaining means comprises a housing 19 mounted centrally of the underside of the cross member 4, said housing having a clearance hole 20 extending therethrough longitudinally of the frame and covered at its ends by cover plates 21. A locking pin 22 slidably extends through holes in said cover plates axially of said clearance hole 20 and has a handle 23 formed on its end adjacent to the handle 10. A compression spring 24 is located on the locking pin between the end plates and has its end remote from the handle 23 contacting the cotter pin 25 extending transversely through said locking pin. A wear plate 26 is located on the lower surface of the end member 16 of the dolly adjacent to the housing 19 and is normally engaged by the free end of the locking pin 22. A retainer plate 27 is located centrally of the underside of the cross member 5 of the hand truck frame and extends a short distance over the lower surface of the end member 17 of the dolly.

In operation, the dolly 14 may be quickly removed from the hand truck by pulling the locking pin 22 rearwardly to disengage its free end from the wear plate 26 at the rearward end of the dolly. This permits the forward end of the dolly to be pulled clear of the retainer plate 27. When the handle 23 of the locking pin 22 is released, the pin is returned to its normal locking position by the expansion of the spring 24 against the cotter pin 25.

It is apparent that the above described dolly 14 may be inserted into the main frame of the hand truck without regard for the angle at which the frame may be tilted. Of course, as the frame approaches a horizontal position, sufficient room must be allowed for the casters 18 of the dolly.

Referring now to Figure 3, there is disclosed a means for assembling and locking a second dolly 30 to the forward end of the hand truck. Projecting outwardly of said forward end are two angle iron members 31 having legs 32 perpendicular to the platform members 6, 6'. In this form the truck may be used in the conventional manner and the angle irons serve the purpose of a toe plate found in an ordinary hand truck.

Slots 33 are formed between the vertical legs 32 and the forward ends of the platform members 6, 6' of the frame. Into said slots 33 are placed a pair of arm extensions 34 of the forward end dolly 30. In order to put the arm extensions into the slots 33, the forward end dolly 30 is first tilted forward so that it forms an acute angle with the truck frame.

Projecting from the under surface of the arm extensions 34 and mounted thereon are a pair of channel members 35. When the arm extensions 34 are inserted into the slots 33 the vertical legs 32 become engaged within said channels 35 longitudinally thereof. Projecting into the center of each channel and parallel to its sides is a stationary pin member 36, said pin member being attached to the base of the channel about one-fourth of the distance from the top of the channel to the bottom. When the arm extensions 34 are fully inserted into the slots 33, the pin 36 is in line with an orifice 37 located in the vertical legs 32 of the angle irons 31. By adjusting the tilt of the forward end dolly 30 so that it forms a right angle with the truck frame, the pin 36 passes through the orifice 37 and locates said dolly in position. In order to lock each angle iron leg 32 securely in its channel 35, a locking pin 38 is slidably mounted through apertures 39 in the sides of each channel adjacent to the pin 36 to contact the outer surface of each said leg 32. Each pin 38 preferably has a hinged tip 40 which normally depends on a vertical to prevent accidental removal of said pin from its channel 35. The dolly 30 is disengaged from the truck frame by tilting it forward and lifting it out of the slots 33. The above construction permits the operator to attach or join the forward end dolly 30 and the truck frame 1 with equal facility whether the main frame is bearing a load of equipment or whether the load is on the dolly itself.

In Figure 4 an alternative means of connecting the forward end dolly at the forward end of the truck is shown. In this form of my invention there is mounted on the under surface of the forward end dolly arm extensions 34 a transversely extending cross member 42, the terminal ends of said member being located adjacent to the inner side of the channel members 35. Assembled on the cross member 42 is a pair of U-shaped bracket members 43 in which retractable elongated pin members 44 are slidably mounted, said pins being supported in line with one another and parallel to the cross member 42. The pins 44 extend from about the center of the cross member 42 to the channels 35 where they pass respectively through the orifices 39 in a similar manner to the pins 38 to lock the forward end dolly 30 in position. A handle 45 is located at the inner end of each pin 44. A compression spring 46 is located on each pin 44 between the ends of its bracket 43 and has its end remote from the handle 45 abutting a cotter pin 47 extending transversely through said pin 44.

In the use and operation of the above described elements, the operator pulls handles 44 simultaneously toward one another. As he does so the cotter pins 47 impinge against the coil springs 46 to compress same. This draws the terminal ends of the pins 44 out of the orifices 39. This permits the forward end dolly 30 to be tilted and removed from the hand truck to which it was attached.

In Figure 5 is shown another means for connecting a forward end dolly 30 to a hand truck of the type I have described. This means is similar to that shown in Figure 4, except that the brackets 43 with spring loaded pins 44 are located on the dolly extension arms 34 in line with the channels 35. No apertures are required in the channels 35 as the terminal ends of the pins 44 extend directly over the angle iron legs 32 to lock them in their respective channels 35 while said legs are positioned therein by the pins 44. The opposite ends of the pins 44 are connected by a rod 48 extending transversely of the forward end dolly 30 and a T-shaped handle 49 projects from the center of said rod 48 at right angles thereto to permit the simultaneous retraction of said pins 44.

It is obvious from the above described locking means that both dollies 14 and 30 can be quickly connected to or removed from the hand truck when not required thereon for moving a particular object, and that said dollies can be made available for other uses during said moving operations without having to be permanently connected to the hand truck.

While in the above specification I have set forth my invention in considerable detail, it will be understood that many variations may be made in these details without departing from the scope and spirit of my invention.

What I claim is:
1. A hand truck of the character described comprising a rectangular frame having a pair of end members and a pair of side members, said side members each having a platform member extending longitudinally of its upper surface, a cross member extending transversely of said frame a sort distance inwardly of each end member, a pair of wheels journalled at the forward end of said frame, a pair of angle iron members extending forwardly and upwardly of the forward end of said frame, a rectangular dolly slidably fitting the inner surfaces of the side members and the cross members to contact the underside of the platform members, and means detachably connecting said dolly to said frame comprising a retaining plate attached to the underside of the forward cross member to slightly overlap the bottom of the dolly, a housing located on the underside of the rear cross member having a clearance hole extending therethrough longitudinally of the frame, a cover plate extending across each end of the hole, a locking pin slidably extending through holes in said plates axially of said clearance hole normally to slightly overlap the bottom of the dolly, a handle formed on the rearward end of said pin, a compression spring located on said pin between said cover plates and a cotter pin extending transversely of said locking pin to contact the forward end of the spring.

2. A hand truck of the character described comprising a rectangular frame having a pair of end members and a pair of side members, said side members each having a platform member extending longitudinaly of its upper surface, a cross member extending transversely of said frame a short distance inwardly of each end member, a pair of wheels journalled at the forward end of said frame, a pair of angle iron members extending forwardly and upwardly of the forward end of said frame, a rectangular dolly slidably fitting the inner surfaces of the side members and the cross members to contact the underside of the platform members and means detachably connecting said dolly to said frame, a second dolly and means detachably connecting said second dolly to the forward end of the frame at right angles thereto comprising a pair of parallel arms extending outwardly of one end of said second dolly, a channel member located longitudinally of the lower surface of each extension arm adjacent to the extremity thereof, a stationary pin extending outwardly of the bottom of each channel, a locking pin slidably located in holes extending transversely of the flanges of each channel, said holes being spaced at least the thickness of the angle iron outwardly of the channel bottom, a slot located between the forward end of each platform member and a vertical leg of each angle iron, and a locating hole extending through each vertical leg adjacent the top thereof, whereby when the extremities of the extension arms of the said second dolly are placed in said slots, the stationary pins of the channels extend into said holes to locate the vertical legs of the angle irons in position prior to inserting said locking pins through the holes in said channel flanges, said second dolly being adapted to partially support an object thereupon while the weight of the remainder of the object is borne by the forward wheels of the dolly within the frame.

References Cited in the file of this patent
UNITED STATES PATENTS

| | | |
|---|---|---|
| 452,714 | Martin | May 19, 1891 |
| 547,617 | Pratt | Oct. 8, 1895 |
| 639,338 | Barns | Dec. 19, 1899 |
| 812,066 | Moore | Feb. 6, 1906 |
| 882,938 | Fleischmann | Mar. 24, 1908 |
| 1,769,271 | Parsons | July 1, 1930 |
| 1,927,710 | Lindsay | Sept. 19, 1933 |

FOREIGN PATENTS

| | | |
|---|---|---|
| 800,099 | Germany | Sept. 1, 1950 |